United States Patent
Rao

[15] 3,663,249
[45] May 16, 1972

[54] METHOD FOR INSOLUBILIZING SODIUM SILICATE FOAM

[72] Inventor: Ramesh P. Rao, Sarnia, Ontario, Canada

[73] Assignee: Fiberglas Canada Limited, Toronto, Ontario, Canada

[22] Filed: Mar. 24, 1970

[21] Appl. No.: 22,373

Related U.S. Application Data

[63] Continuation-in-part of Ser. No. 875,568, Nov. 10, 1969, abandoned.

[52] U.S. Cl. ................................................. 106/75, 252/62
[51] Int. Cl. .................................... C04b 21/00, F16l 59/00
[58] Field of Search ............................... 106/74, 75; 252/62

[56] References Cited

UNITED STATES PATENTS

| | | | |
|---|---|---|---|
| 3,574,113 | 4/1971 | Shannon | 252/62 |
| 3,508,940 | 4/1970 | Nakamura et al. | 106/75 |
| 3,498,807 | 3/1970 | Gresham | 106/74 |
| 3,382,082 | 5/1968 | Eubanks et al. | 252/62 X |
| 3,396,112 | 8/1968 | Burrows | 252/62 |
| 3,449,141 | 6/1969 | Binkley et al. | 252/62 X |
| 3,523,085 | 8/1970 | Shannon | 252/62 |
| 3,410,706 | 11/1968 | Peeler | 106/74 |

*Primary Examiner*—Harold Ansher
*Attorney*—Stevens, Davis, Miller & Mosher

[57] ABSTRACT

Insoluble silicate foams which exhibit good permanence and weather resistance for use in structural applications may be produced by foaming a dry reaction mixture of hydrated silicate and complexing agent which has been prepared by mixing particulate alkali metal or alkaline earth metal silicate and the complexing agent and treating tat mixture with saturated steam at the hydration temperature of the silicate, thereby achieving uniform distribution and penetration of the reactants.

9 Claims, No Drawings

3,663,249

METHOD FOR INSOLUBILIZING SODIUM SILICATE FOAM

CROSS REFERENCE TO RELATED APPLICATIONS

This application is a continuation-in-part of my application U.S. Ser. No. 875,568, filed Nov. 10, 1969, now abandoned and entitled "Process For making Silicate Foams From Alkali Metal Silicate."

This invention relates to a method of producing silicate foam which is insoluble and accordingly can be used in structural applications where permanence and weather resistance are required. Numerous methods of producing insolubilized silicate foams have been reported. These normally involve the reaction of a polymerizing agent with an aqueous solution of sodium silicate. In the latter, the silicate and sodium are present as discrete ions or polar molecules, depending on the concentration and viscosity of the solution. The rate of reaction of an insolubilizing agent in such a system varies with varying concentrations of these ions as well as the concentration and nature of the complexing agents. Foamable compositions produced in the above method have been known to dehydrate at a rapid rate, producing distinct phases of soluble and insoluble silicates, and interfering with the foaming of the material.

The present invention relates to a method of insolubilizing the silicate foam, where the reaction system consists of solid silicate, water of hydration, and a complexing agent.

The present invention therefore provides a method of producing foamable material comprising the step of reacting particulate silicate material chosen from alkaline earth metal silicates and alkali metal silicates, with an effective amount, up to 30 percent by weight, of a complexing agent chosen from polyvalent metal compounds, together with any necessary water of hydration, by heating the mixture to the hydration temperature of the silicate.

The reaction may be carried out in the presence of a solvent. The complexing agent may be a solid particulate material or it may be in solution. The foamable mixture may be prepared using particulate silicate, solvent, and a complexing agent which is then heated, such as by steam treatment, to hydration and cooled to form a glassy material. This material may be stored for prolonged periods without undergoing material changes in its composition or nature. The insolubilizing reaction proceeds substantially to completion during the subsequent foaming process.

In accordance with the present invention a complexing agent is included in the silicate mixture. The complexing agent is chosen from the compounds of polyvalent metals and will normally be present in an amount of 5 to 30% in a mixture containing sodium silicate. The following form a preferred group of metals: aluminum, boron, titanium, zirconium, iron, chromium, calcium, magnesium, molybdenum, zinc, manganese. A preferred group of anions for such metal compounds is as follows: acetate, formate, formoacetate, phosphate, sulfate, borate, nitrate, carbonate, oxide, hydroxide, fluoride, chloride, pyrosulfate, pyrophosphate, titanate, and molybdate.

The complexing agent should be mixed with the silicate, prior to the foaming thereof, and preferably at a temperature of between 20° to 100° C. The silicate may be present in the form of a particulate dry silicate, either anhydrous or hydrated. The silicate may be foamed by any conventional means such as microwave, induction, thermal heating source or chemical heat energy to yield an insoluble light weight inorganic silicate foam of low thermal conductivity and high thermal stability.

The present invention finds particular applicability to the insolubilization and foaming of sodium silicate and in this connection an especially preferred group of complexing agents is the group consisting of potassium titanate ($K_2Ti_6O_{13}$), $AlF_3$, $Al(OH)_3$, and $Ca B_4 O_7$, and boric acid ($H_3BO_3$). The complexing agent may be formed in situ.

The foams produced in accordance with the various embodiments of the present invention were found to have satisfactory weather resistance and humidity resistance. These properties were confirmed by tests which are conventional and are known to persons skilled in the art. For example, the following procedures were carried out on the tested samples:

a. a piece of the foam was suspended in boiling water and the extent of degradation and disintegration of the foam was observed over a period of several hours.

b. a portion of the foam was exposed to steam under pressure of 5 psig for periods of up to an hour and the foam was observed for changes in physical properties such as dimensional changes and the extent of degradation again was observed.

c. a portion of the foam was stored for periods of up to 6 months at ambient temperatures and humidity and inspected for evidence of degradation and particularly moisture pickup.

In preparing the foamed products in the examples disclosed herein the particulate or powdered sodium silicate was mixed with a stoichiometric amount of the complexing agent, and water, and heated to the optimum temperature to achieve the required degree of hydration. The mixture was treated with steam to achieve uniform distribution and penetration of the reactants.

The following examples illustrate certain embodiments of the invention:

EXAMPLE 1

| | |
|---|---|
| SS–65 (anhydrous) | 685 grams |
| $H_3BO_3$ (fine powder) | **40 grams |
| Ti(OH)$_4$ (soluble cake) | 25 grams |
| $H_2$ O | 231 grams |
| Igepol CO 630 (wetting agent) (trademark) | 0.5 grams |

The sodium silicate was a fine particulate anhydrous material having a ratio of $Na:SiO_2$ of 1:3.22, and a mesh size of 65. These materials were thoroughly mixed together and then steam treated in an autoclave for 20 minutes at 30 p.s.i.g. at a temperature of 108° C. After steam treatment, and hydration, it was cooled to a glassy mass and ground to a fine powder, which was storable. Some of the material was then compressed to a visco-plastic and fluid-like mass at a temperature of 100° C. and a pressure of 200 p.s.i.g. and foamed. The foam was highly stable and resistant to boiling, autoclaving, and water. It had a density of 7.5 pounds per cubic foot.

EXAMPLE 2

| | |
|---|---|
| SS–65 (anhydrous) | 65.1 % |
| Al(OH)$_3$·xH$_2$O (69% Al$_2$O$_3$) | |
| RH–730 (trademark of Reynolds Metal Company) | 3.6% |
| $H_3BO_3$ | 5.2 % |
| Calcium tetraborate | 0.9% |
| FN500 polyethylene powder) | 1.8% |
| MgOCl | 0.09% |
| $H_2O$ | 23% |
| Triton X100 (surfactant) (trademark) | 0.03% |
| Igepol CO 630 (trademark of BASF) | 0.01% |
| Ti(OH)$_4$ | 0.25% |

These materials were thoroughly mixed together and steam treated in an autoclave for 20 minutes at 30 p.s.i.g. at a temperature of 110° C. It was then cooled to a glassy mass and ground to a fine powder as in Example 1. Foams made from this mixture and water. The weight gain in autoclave at 5 p.s.i.g. after 15 minutes was 0.46 percent and after 1.5 hours was 4.38 percent. The weight gain percent in the ageing test for 96 hours at 120° F. and 98 percent relative humidity was 98. Typical foam had a density of 7.28 p.c.f.

EXAMPLE 3

| | |
|---|---|
| SS–65 (anhydrous) | 66.7 |
| RH–730 (trademark of Reynolds Metal Company) | 3.6 |
| H$_3$BO$_3$ | 5.3 |
| H$_2$O | 23.1 |
| Triton X100 surfactant (trademark of Rohm & Hass Co.) | 0.1 |
| TiOSO$_4$ | 1.2 |
| Tetra Butyl Titanate | 0.08 |

The procedure of Example 1 was carried out on this mixture. Foams made from this mixture were highly stable and resistant to boiling, autoclaving, and water. The weight gain in autoclave at 5 p.s.i.g. after fifteen minutes was 2.53 percent. A typical foam made from this material had a density of 12.80 pounds per cubic foot. The foam exhibited a K value of 0.474 BTU/HrFt$^2$ (F°/in).

EXAMPLE 4

| | |
|---|---|
| SS–65 (anhydrous) | 62.1 |
| RH–730 (trademark of Reynolds Metal Company) | 3.4 |
| H$_3$BO$_3$ | 4.9 |
| Calcium tetraborate | 0.9 |
| FN 500 (polyethylene powder) | 1.8 |
| MgOCl | 0.09 |
| H$_2$O | 22.0 |
| Triton X100 (surfactant) (trademark) | 0.03 |
| Igepol CO 630 (trademark) (wetting agent) | 0.01 |
| Ti(OH)$_4$ | 4.8 |

The procedure of Example 1 was carried out on this mixture. Foams made from this mixture were highly stable and resistant to boiling, autoclaving, and water. The weight gain in autoclave at 5 p.s.i.g. for 15 minutes was 0.87 percent and after 1.5 hours was 6.40 percent. The weight gain per cent in the aging test for 96 hours at 120° F. and 98 percent relative humidity was 69.6 percent. A typical foam made from this material had a density of 11.17 pounds per cubic foot.

EXAMPLE 5

| | |
|---|---|
| SS–65 (anhydrous) | 57% |
| H$_3$BO$_3$ | 5% |
| Calcium silicate (Wollastonite) | 15% |
| RH–730 (trademark) | 3% |
| H$_2$O | 20% |

This mixture was treated as in Example 1 and was found to yield a satisfactory boil and water resistant foam.

EXAMPLE 6

| | |
|---|---|
| SS–65 (anhydrous) | 685 grams |
| H$_3$BO$_3$ (fine powder) | 40 grams |
| K$_2$Ti$_6$O$_{13}$ | 25 grams |
| H$_2$O | 231 grams |
| Igepol CO 630 (wetting agent) (trademark) | 0.5 grams |

The procedure of Example 1 was carried out in this mixture. Foams made from this mixture were stable and resistant to boiling, autoclaving and water. The weight gain in the autoclave at 5 psig for 1 hour was 5 percent.

I claim:

1. In the production of water-resistant foamed silicate products, by expanding a hydrated silicate chosen from alkaline earth metal silicates and alkali metal silicates, along with an effective amount, in the range of 5 to 30 percent, of a polyvalent metal compound as a complexing agent, the improvement comprising mixing the complexing agent with dry particulate silicate material and treating the mixture with saturated steam at an elevated temperature, to a predetermined hydration level whereby the reactants are uniformly distributed in the hydrated mixture, cooling the thus-treated mixture and recovering the same as a solid, glassy product.

2. A method as in claim 1 wherein the silicate material comprises calcium or magnesium silicate.

3. A method as in claim 1 wherein the complexing agent is a compound of a metal chosen from the group consisting of aluminum, boron, titanium, zirconium, iron, chromium, calcium, magnesium, molybdenum, zinc, manganese, vanadium.

4. A method as in claim 1 wherein the silicate material comprises sodium or potassium silicate.

5. A method as in claim 4 wherein the hydration temperature is in the range of 200° to 600° F.

6. A method as in claim 4 wherein the complexing agent is present in an amount of 5 to 30 percent by weight.

7. A process as in claim 4 wherein the complexing agent is a compound of a metal chosen from the group consisting of aluminum, boron, titanium, zirconium, iron, chromium, calcium, magnesium, molybdenum, zinc, manganese, vanadium.

8. A method as in claim 4 wherein the compound has an anion chosen from the group consisting of acetate, formate, formoacetate, phosphate, sulfate, borate, nitrate, carbonate, oxide, hydroxide, fluoride, chloride, pyrosulfate, pyrophosphate, titanate, and molybdate.

9. A method as in claim 4 wherein the complexing agent is chosen from the group consisting of K$_2$Ti$_6$O$_{13}$, Al F$_3$, Ti(OH)$_4$, Al(OH)$_3$, Ca B$_4$O$_7$, H$_3$BO$_3$ and molybdic acid.

* * * * *